(12) United States Patent
Burnside et al.

(10) Patent No.: US 11,928,542 B2
(45) Date of Patent: Mar. 12, 2024

(54) DIRECTION SENSING OF MOVING RFID TAGS

(71) Applicants: DJB Group LLC, Dublin, OH (US); Wistron NeWeb Corporation, Hsinchu (TW)

(72) Inventors: Walter D. Burnside, Dublin, OH (US); Wei-Feng Tsai, Dublin, OH (US)

(73) Assignees: DJB GROUP LLC, Dublin, OH (US); WISTRON NEWEB CORPORATION, Hsinchu (TW)

( * ) Notice: Subject to any disclaimer, the term of this patent is extended or adjusted under 35 U.S.C. 154(b) by 0 days.

(21) Appl. No.: 17/654,601

(22) Filed: Mar. 14, 2022

(65) Prior Publication Data

US 2023/0306211 A1    Sep. 28, 2023

(51) Int. Cl.
*G06K 7/10* (2006.01)
(52) U.S. Cl.
CPC ................... *G06K 7/10366* (2013.01)
(58) Field of Classification Search
USPC ........................................................ 235/451
See application file for complete search history.

(56) References Cited

U.S. PATENT DOCUMENTS

| | | | |
|---|---|---|---|
| 8,058,998 B2 | 11/2011 | Burnside et al. | |
| 10,332,058 B1* | 6/2019 | Kandregula | G06Q 10/083 |
| 2004/0070501 A1 | 4/2004 | Degrauwe et al. | |
| 2007/0030150 A1 | 2/2007 | Mullins | |
| 2008/0174432 A1 | 7/2008 | Ulrich | |
| 2009/0256683 A1 | 10/2009 | Stephenson et al. | |
| 2010/0052867 A1 | 3/2010 | Kwok et al. | |
| 2014/0159869 A1* | 6/2014 | Zumsteg | G07G 1/009 340/10.1 |
| 2016/0371893 A1 | 12/2016 | Busch-Sorensen | |
| 2018/0173912 A1* | 6/2018 | Duron | G06K 7/10425 |
| 2019/0163942 A1* | 5/2019 | Lavery | G06K 19/06028 |
| 2020/0104790 A1* | 4/2020 | Chung | H04W 4/029 |
| 2020/0125808 A1 | 4/2020 | Yaginuma | |
| 2020/0364421 A1* | 11/2020 | Wappler | G06K 7/10316 |

(Continued)

FOREIGN PATENT DOCUMENTS

| | | |
|---|---|---|
| EP | 1220163 A1 | 7/2002 |
| WO | 2022/108706 A1 | 5/2022 |

OTHER PUBLICATIONS

European Search Report of Corresponding EP Application No. 23160886.0, date of completion of the search Jul. 6, 2023.

*Primary Examiner* — Ahshik Kim
(74) *Attorney, Agent, or Firm* — Pearne & Gordon LLP

(57) ABSTRACT

A system for detecting the direction of movement of an RFID tag along a path comprising two RFID portals, each of said portals being arranged to detect an RFID tag in a respective zone along the path, the zones being arranged to be effectively exclusive of one another, a RFID tag reader having an associated processor and multiple separate ports, each port being connected to one or the other of the portals, the processor being arranged to determine which portal first receives a RFID tag signal or signals and which portal subsequently receives a second signal from the same tag or tags detected by the first signal receiving portal, the processor providing a signal corresponding to a direction of movement, along the path from the first signal receiving portal to the second signal receiving portal.

8 Claims, 3 Drawing Sheets

(56) References Cited

U.S. PATENT DOCUMENTS

2021/0097826 A1\* 4/2021 Trivelpiece ........ G08B 13/2417
2022/0044191 A1\* 2/2022 Haak .................. G06K 7/10099
2022/0374828 A1\* 11/2022 Toureilles .......... G06K 7/10475

\* cited by examiner

DIRECTION SENSING OF MOVING RFID TAGS

BACKGROUND OF THE INVENTION

The invention relates to systems for reading RFID tags present at a zone and, more particularly, the direction such tags are being moved along a known path.

PRIOR ART

Doorways, such as found at a loading (or unloading) dock of a building or other like gateways are monitored, in recent times, by a RFID reader and associated antennae to record the identity of tags passing through the doorway/gateway into or out of the associated building.

A problem exists where RFID tagged goods are moved through the gateway. Typically, the RFID reader cannot determine whether a detected tag is moving into or out of the building. This inability to distinguish goods coming from goods going, inter alia, can lead to a loss of inventory control.

SUMMARY OF THE INVENTION

The invention provides an RFID tag monitoring system capable of sensing the direction of movement (hereafter "DOM") of the tags along a path, such as through a door or other gateway. In disclosed embodiments, the system includes a RFID portal arrangement that receives tag signals from two distinct zones effectively spaced from each other along the path. A processor, such as provided by a small board computer associated with a RFID reader senses which portal zone first detects a tag signal and automatically determines the tag(s) are moving from such zone towards the other portal zone. Each RFID portal can utilize, preferably, two antenna such as described in U.S. Pat. No. 8,058,998 (marketed under the mark WAVE™) superposed, spaced, reversed end for end, and shrouded with metal foil on the back and two sides. Such portals are characterized as inexpensive and light in weight. The portal is easily carried and installed by a workman. Where the door opening is relatively wide, as is common in Asian countries, a portal can be located at ceiling level on existing structure without concern of added weight. Portals can be mounted end to end to adequately cover the area of a wide dock door.

Elevated RFID portals, sometimes at ceiling height, especially associated with a dock door, have the advantage of being out of the way of material handling equipment such as a lift truck. The overhead location of such RFID portals eliminates the risk of being accidentally struck by such equipment.

DESCRIPTION OF THE PREFERRED EMBODIMENTS

In the following description and claims, the term portal, as used herein, is an elongated RFID radiating structure. A portal, for example, can be two radiating sections such as disclosed in U.S. Pat. No. 8,058,998, one superposed on the other, contained in a U-shaped metal foil channel, being spaced from the web or back of the channel by foam or plastic cardboard, and spaced from each other by plastic foam or plastic cardboard. A portal can have directional characteristics when the flanges or sides of the metal channel limit radiation from the radiator(s) to a beam width preferably of about 100 degrees, but may vary from 95 degrees to 120 degrees. A portal can be of any desired length using RFID radiators of various length arranged longitudinally. Multiple radiators forming the same portal, such as provided by the antenna disclosed in U.S. Pat. No. 8,058,998 (WAVE™) radiate radio signals in different directions and paths so as to excite essentially all RFID tags in their range regardless of random orientation of the tags. That is, a RFID portal is preferably composed of elongated radiator sections each with an array of multiple dipoles that create multiple beams. In various described embodiments, two separate RFID portals are spaced from each other in a direction parallel to the expected or normal DOM of an RFID tag or tags. The portals can be floor mounted or mounted anywhere above the floor, most practically at or about ceiling height.

Figure 1:
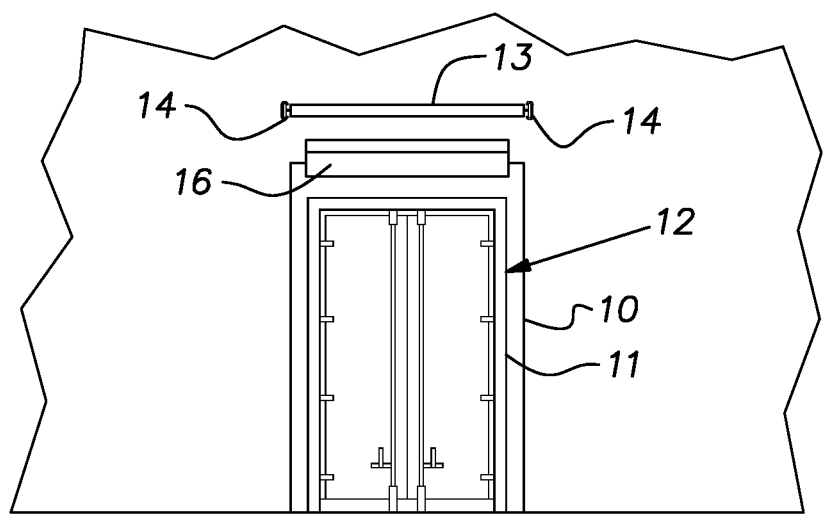
FIG. 1 is an elevational view of a dock door opening seen from inside a building.

FIG. 1 illustrates a 10 foot dock door opening 10 and the perimeter 11 of a cargo box of a truck or trailer viewed from inside of a building. A door 13 for closing the door opening is retracted or rolled up above the door opening 10. The door 13 can be a sectional door, known in the art, retracted on rails 14. Other known door types can be used with the invention as long as their retracted or open position does not interfere with radio signals associated with the RFID portals to be described. An elevated or ceiling RFID portal 16 is mounted just below the retracted dock door. The overhead portal 16 scans downwardly towards the floor to detect RFID tagged package containers in the form of a wire cart or a wire container used in the shipping industry, a pallet, or gaylord box or other conveyance. An RFID conveyance tag 18 is preferably attached to an upper part of the container or conveyance 17 so as to be easily read by the portal 16.

Figure 2:
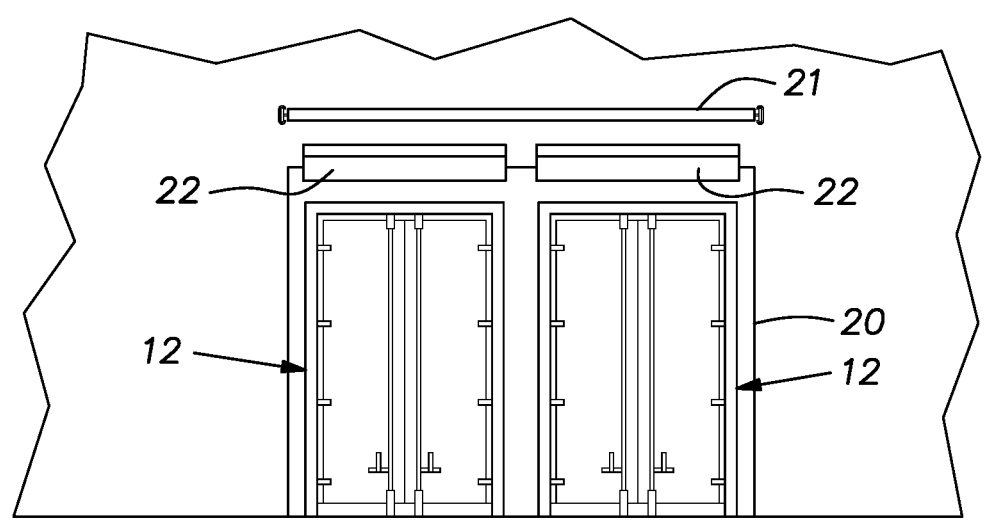
FIG. 2 is an elevational view of a wide dock door opening seen from inside a building.

FIG. 2 schematically illustrates a relatively wide 20 foot door opening 20 to accept two or more vehicles, trucks and/or trailers 12. Above the door opening 20 and below a retracted or rolled up door 21 are a pair of RFID portals 22 arranged end to end, but with a limited gap enabling them to scan over the full door opening 20. Door openings, especially in Asia, can be wider than 20 foot and a sufficient number of portals arranged end to end can be used to radiate and scan the full door opening.

Figure 3:
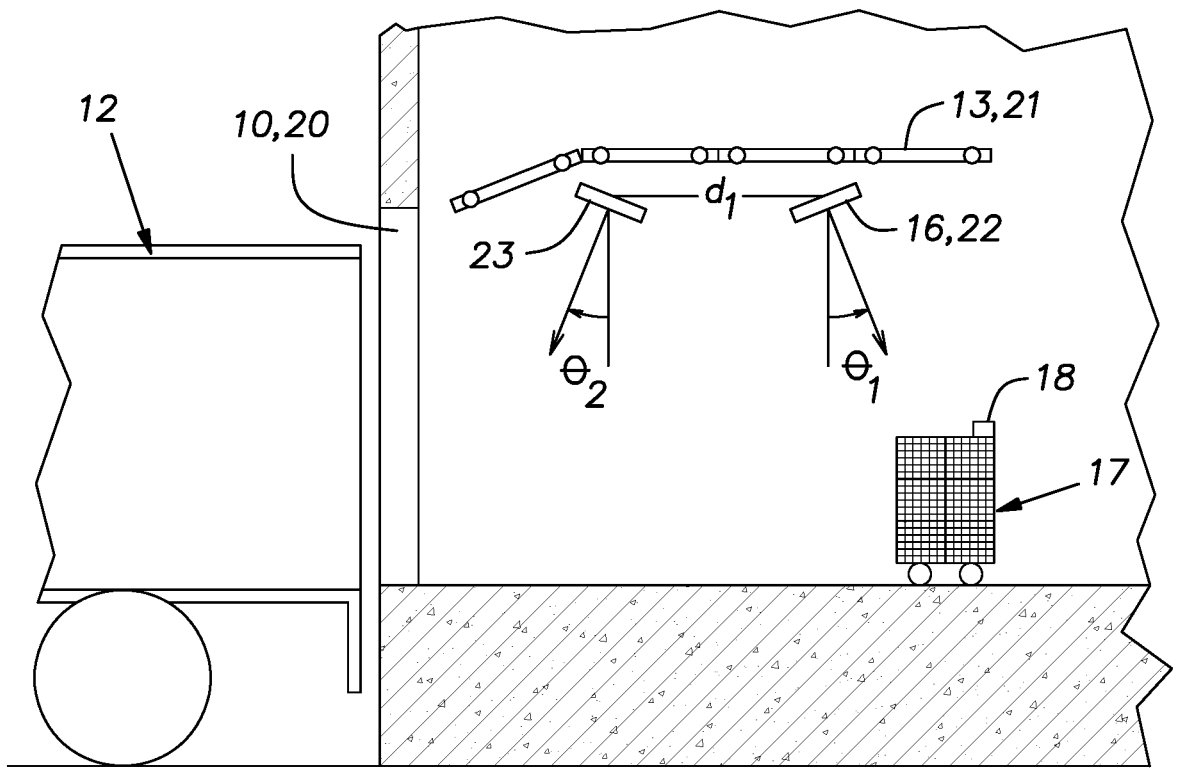
FIG. 3 is a somewhat schematic vertical sectional view of the dock door opening of FIGS. 1 and 2.

FIG. 3 is a schematic side view of the arrangements of FIG. 1 and FIG. 2. A truck 12 (and/or trailer) is backed up to an open dock door 13, 21. The vehicle 12 can be on a ramp, below grade, so that its cargo floor is level with a floor of the building, such as a warehouse. The door 13, 21 of the opening 10, 20 is retracted or rolled up for access through the opening. Two RFID portals 16, or 22 and 23 are supported below the retracted door 13, 21 as for example on rails supporting panels where the door is a sectional door. The portals 16 or 22 and 23 are spaced a distance di, measured in a direction parallel to the path of goods into or out of the vehicle 12. The portals 16 or 22 and 23 when having a directional character can be tilted with an angle θ1, or θ2 so that they are directed away from each other. These angles can typically be between 10 and 30 degrees.

Figure 6:
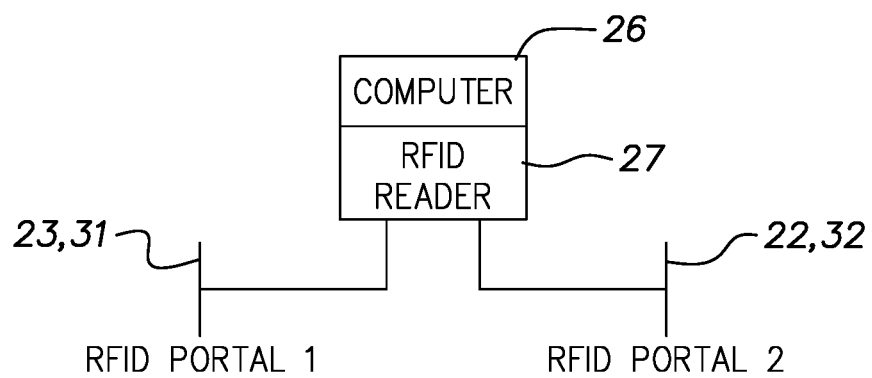
FIG. 6 is a schematic wiring diagram of a system embodying the invention.

As shown in FIG. 6, two spaced RFID portals are connected to respective ports in an RFID tag reader 27. A computer 26 can be a single board or small board computer hard wired to the reader 27. The reader 27 alone and/or computer 26 includes a processor (such as an integrated circuit), discrete circuitry, memory, transceivers (or transmitters and/or receivers individually), and/or input/output interfaces (such as ports, terminals, and the like).

The direction of movement (DOM) of an object bearing an RFID tag is determined by which portal first senses a particular tag or tags. If the portal 23 closest to the door is first to detect a particular RFID tag or tags, the computer 26 (FIG. 6) or reader 27 if provided with a processor, is programmed to signal that goods are inbound; if the portal 16 or 22 remote from the door is first to detect a RFID tag or tags, the computer 26 or reader 27 is programmed to signal that goods are outbound.

A wheeled wire cart or container 17 indicated in FIG. 3 can carry an RFID tag 18 on its upper face or edge that can be detected by the portals 16, 22, 23. By arranging the tag 18 adjacent the top of the cart 17 or stock or pile of RFID tagged goods in or on another conveyance such as a container or pallet, the power of the portals can be adjusted down so as to not read RFID tags on other conveyances.

Figure 4:
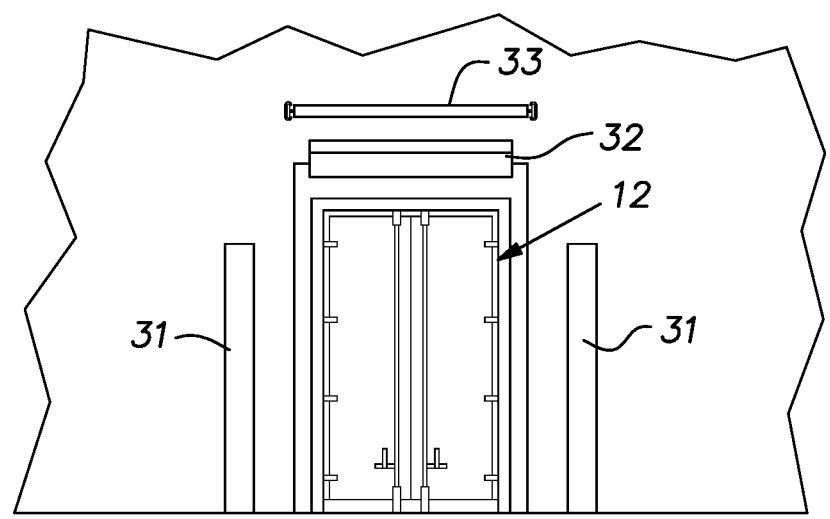
FIG. 4 is an elevational view of a dock door opening seen from inside a building.
Figure 5:
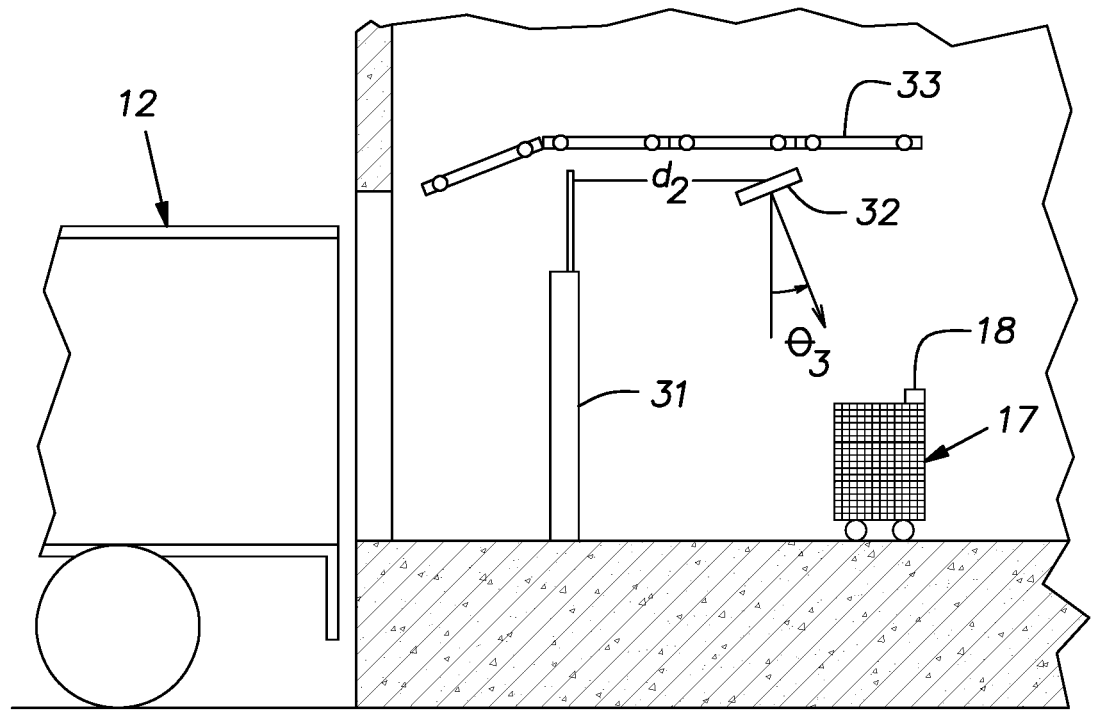
FIG. 5 is a somewhat schematic vertical sectional view of the dock door opening of FIG. 4.

FIGS. 4 and 5 illustrate another multi-portal arrangement for DOM sensing. Inside the building, adjacent the sides of the dock door opening 10 are floor mounted RFID portals 31. Another RFID portal 32 is overhead just below a rolled up door 33. FIG. 5 shows that the door portals and overhead portal are spaced a distance d 2 measured in a direction parallel to motion of goods in or out of the truck; the overhead portal 32 is tilted away from the floor mounted portals 31 at an angle θ3. If the overhead portal 32 first detects a tag 18 with a container 17 the computer 26 is programmed to signal goods leaving and if the floor mounted portals 31 first detect a container tag 18 the computer 26 is programmed to signal goods coming into the building.

While the invention has been shown and described with respect to particular embodiments thereof, this is for the purpose of illustration rather than limitation, and other variations and modifications of the specific embodiments herein shown and described will be apparent to those skilled in the art all within the intended spirit and scope of the invention. Accordingly, the patent is not to be limited in scope and effect to the specific embodiments herein shown and described nor in any other way that is inconsistent with the extent to which the progress in the art has been advanced by the invention.

What is claimed is:

1. A system for detecting the direction of movement of an RFID tag along a path through and perpendicular to an opening comprising two RFID portals at the same side of the opening, spaced apart along a direction parallel to said path, and each oriented to scan said path, each of said portals being arranged to detect an RFID tag in a respective zone along the path, the zones being arranged to be effectively exclusive of one another, a RFID tag reader having an associated processor and multiple separate ports, each port being connected to one or the other of the portals, the processor being arranged to determine which portal first receives a RFID tag signal or signals and which portal subsequently receives a second signal from the same tag or tags detected by the first signal receiving portal, the processor providing a signal corresponding to a direction of movement, along the path from the first signal receiving portal to the second signal receiving portal.

2. A system as set forth in claim 1, wherein the portals have a directional character and are each oriented towards its respective zone and away from the zone of the other portal.

3. A system as set forth in claim 1, wherein the portals are spaced from each other in a direction parallel to the path.

4. A system as set forth in claim 1, wherein at least one of the portals is disposed above the path.

5. A system as set forth in claim 1, wherein the processor is provided by a small board computer.

6. The system of claim 1, wherein one of said portals is mounted overhead of said path and the other of said portals is floor mounted adjacent said path.

7. The system of claim 6, wherein the other portal is floor mounted at one side of the path and a third portal is floor mounted at a side of said path opposite said other portal.

8. The system of claim 6, wherein the floor mounted portal is adjacent a dock door opening and the overhead mounted portal is remote from said opening.

* * * * *